UNITED STATES PATENT OFFICE.

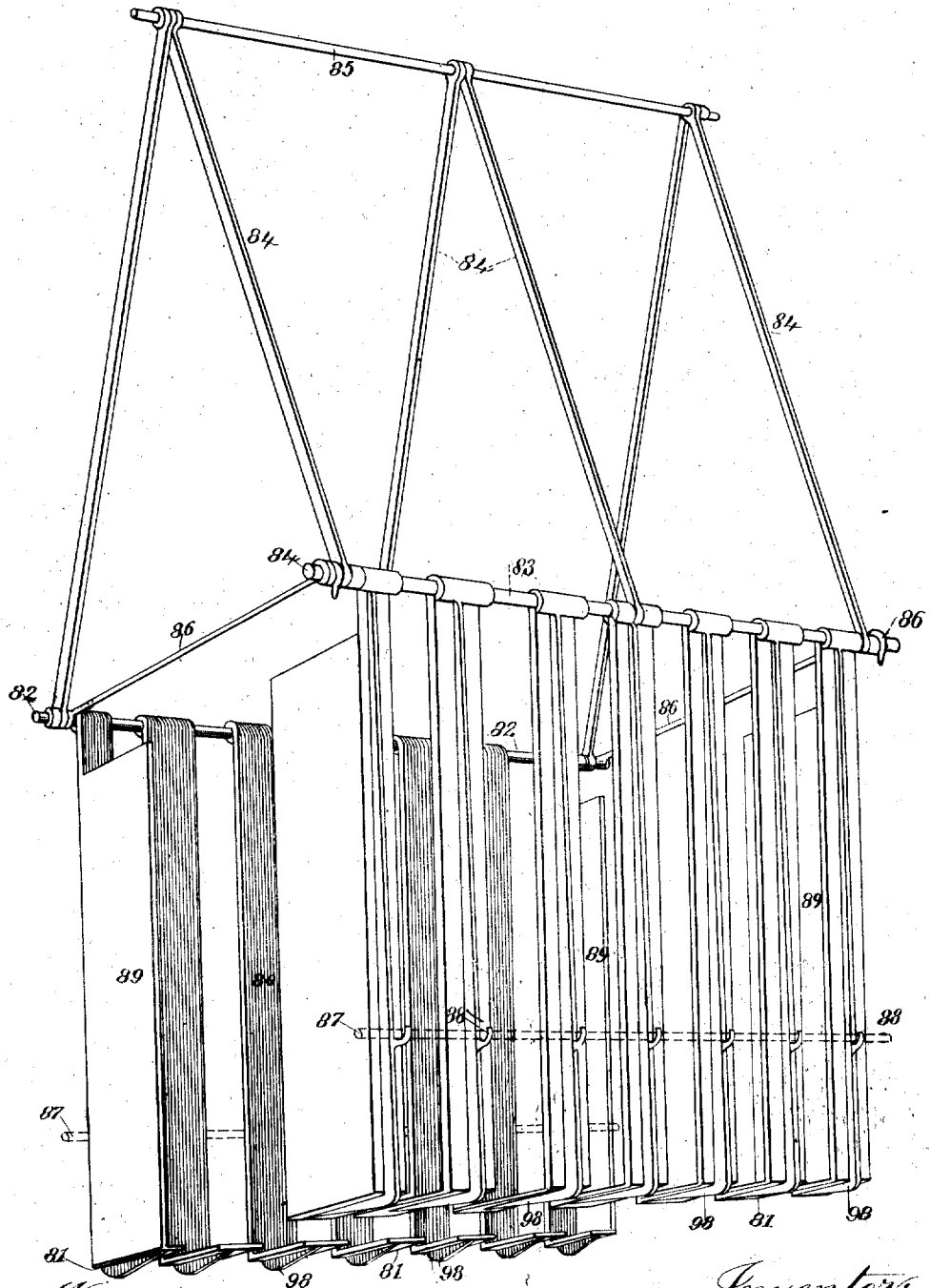

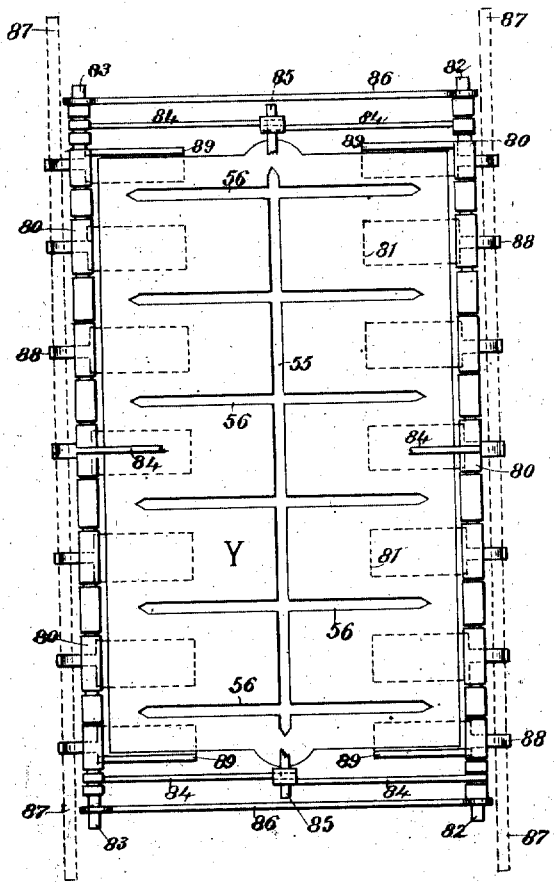

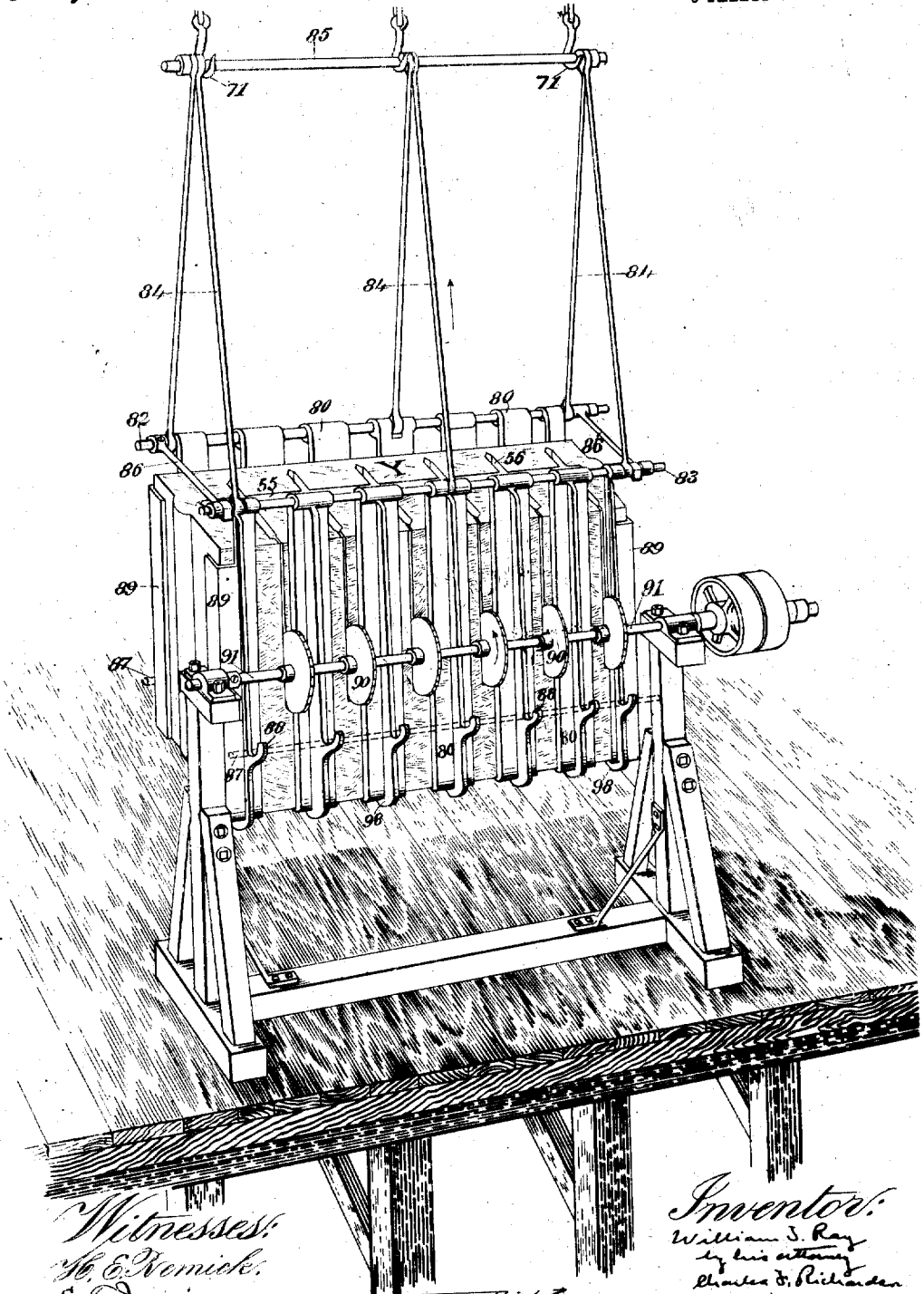

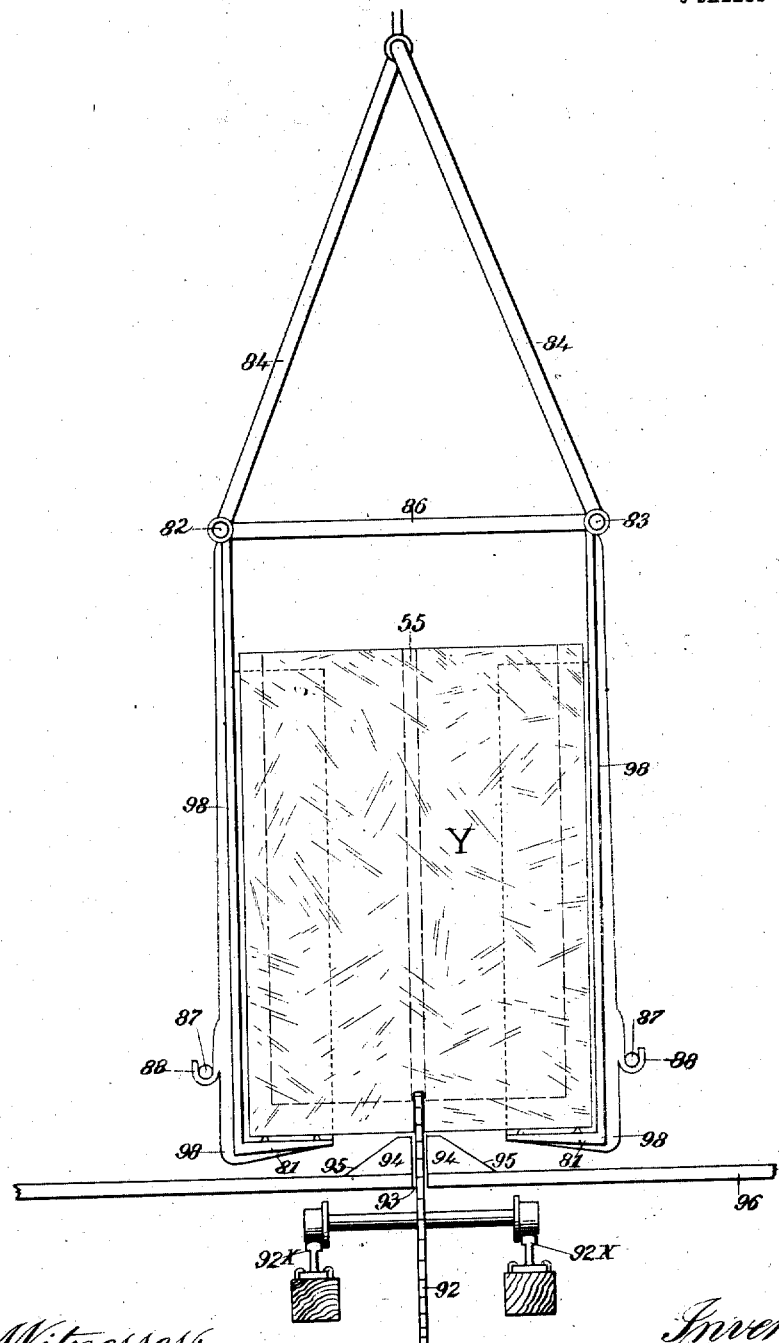

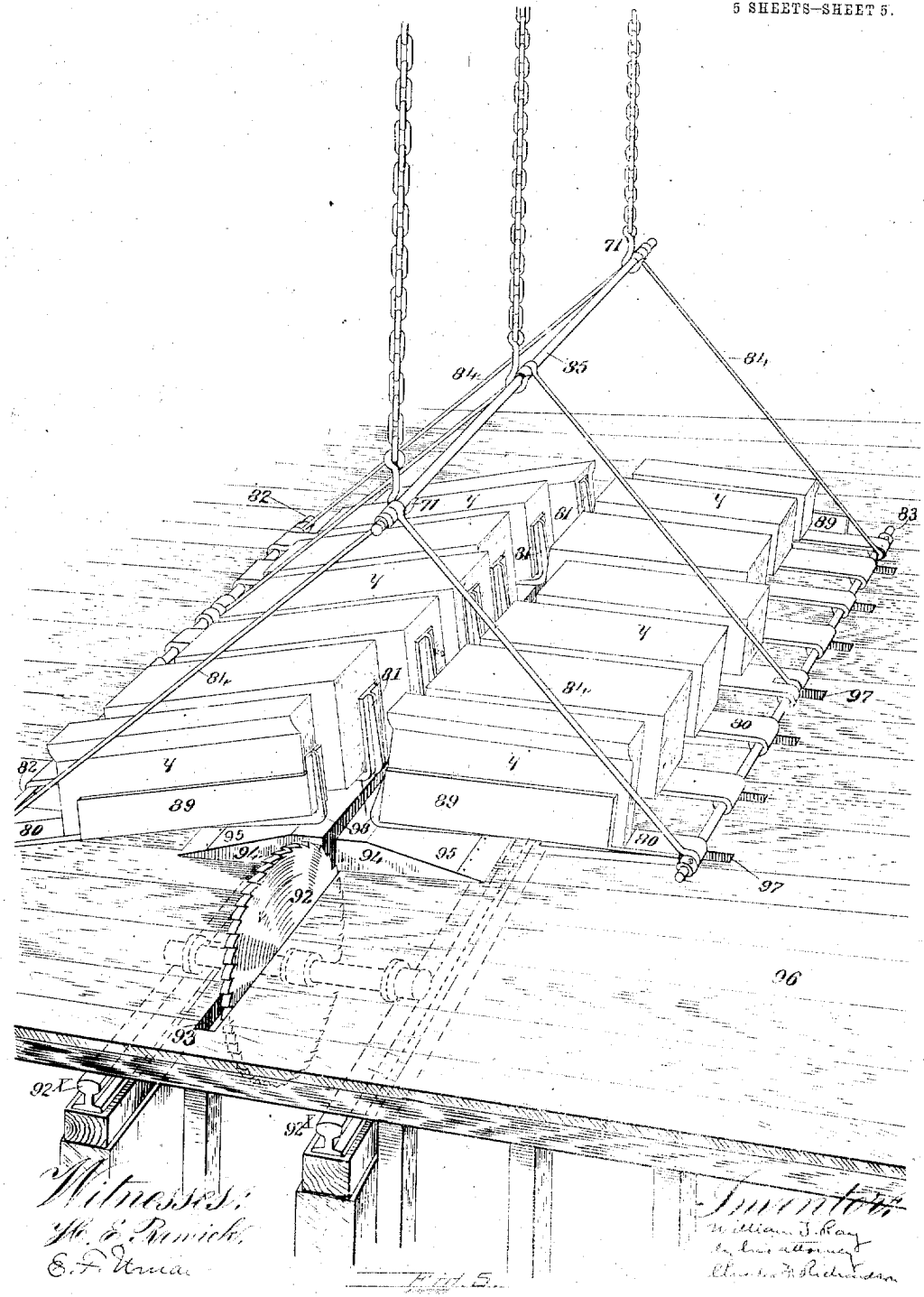

WILLIAM T. RAY, OF SOMERVILLE, MASSACHUSETTS.

GRAB APPARATUS FOR ICE-MACHINES.

990,591.  Specification of Letters Patent.  Patented Apr. 25, 1911.

Original application filed March 28, 1910, Serial No. 551,827. Divided and this application filed June 4, 1910. Serial No. 564,924.

*To all whom it may concern:*

Be it known that I, WILLIAM T. RAY, a citizen of the United States, residing at Somerville, in the county of Middlesex and State of Massachusetts, have invented certain new and useful Improvements in Grab Apparatus for Ice-Machines, of which the following is a specification, reference being had therein to the accompanying drawings.

My invention relates to grab apparatus; and while the particular embodiment of my invention, described and disclosed herein, is designed for use in harvesting artificial ice, yet it is to be understood that the principle of my invention may be embodied in other forms, suitable for work in other environments.

This application is a division of application for United States Letters Patent for "ice making machines," Serial No. 551,827, filed by me, March 28th, 1910, to which reference may be had for a full description of the formation of a block of artificial ice, and its delivery upon a harvesting table outside of the freezing tank.

In the drawings illustrating the principle of my invention, and the best method now known to me of embodying the same, Figure 1 is a perspective view of a grab employed in harvesting a block of artificial ice after its delivery to a harvesting table. Fig. 2 is a plan view showing the grab and a block of ice contained therein; portions of the grab being broken away to show clearly the transverse and the longitudinal harvesting slots in the block of ice described in the above mentioned parent application. Fig. 3 is a perspective view showing the grab sustaining the block of ice while it is being cut transversely into smaller blocks. Fig. 4 is an end view of the grab showing the smaller blocks of ice held therein, while they are being cut longitudinally into the resulting marketable pieces. Fig. 5 is a perspective view of the grab with the contained resulting pieces of ice, the grab having been moved into position to permit the several pieces of ice, in the marketable condition, to slide off the grab, and onto, say, a delivery floor.

As each of the blocks of artificial ice Y. for which my grab is designed, has harvesting slots 55, 56, that almost divide and sever the block longitudinally and transversely into, say, fourteen resulting pieces, my grab is provided with seven pairs of legs 80 and feet 81, one leg and foot for each piece of ice. The legs of each pair are, at their top portions, pivoted respectively to a pair of parallel pivot rods, 82, 83, which, in turn, by links 84, are pivoted to a third parallel or hook rod 85, serving to be caught and sustained as by the hooks 71 of a traveling hoist, not here shown. The parallel pivot rods may be held at the desired distance apart, *i. e.* a little more than are the opposite sides of the block, by lock rods 86, while operating rods 87 are removably mounted in hook supports 88 on the backs of the legs. The tops of the feet have sharp spiked surfaces, while each leg of each end pair has a shield 89 to prevent end pieces of ice from falling out of what might be termed the "cage", formed by these legs and feet. To use this grab or cage, which is assumed to be operatively connected with a traveling hoist, the cage may be lowered down over the block, on the harvesting table; the feet being swung out by the operating rods 87 to permit the feet to pass down the outside of the block. When they reach the bottom, they are slid in under the block; the sides of the table being far enough in from the bottom edges of the block, not to interfere with this inward movement of the feet. When the latter are in proper adjustment, and the hoist raises the cage, the feet and spikes engage the bottom of the block, the block is lifted and may be carried away for further steps in the process of harvesting, viz. completely severing the block into the number of smaller blocks contemplated.

A series of circular ice saws 90, Fig. 3, is mounted on a shaft 91, in suitable bearings, and driven by suitable power. The distance between each adjacent saw equals the distance between the transverse harvesting slots 56 in the ice, and the radius of each saw is enough to permit each saw to cut through the ice separating the ends, and bottoms, of the harvesting slots from the outside of the block. A reference to Fig. 3 will show how the saws operate. The cage is moved toward and partially under the saws, until the saws and the transverse harvesting slots are in the same vertical planes. The cage with the block is then gradually raised; the saws severing the ice as indicated. When the sides are cut, the block is next moved horizontally against the saws, so that that portion of the bottom of the block, separating the bottom from the bottom of the transverse harvesting slots, is cut in the plane of said slots. When the bottom has been cut across, the cage is lowered, on the other side of the saw shaft, and the remaining ice between the outside of the block and the ends of the transverse harvesting slots, is severed. The block has now been cut up into seven small blocks that remain to be cut longitudinally. This may be done by a circular saw 92, see Figs. 4 and 5, that may be moved along under the cage and contained blocks; the saw being controlled by rails 92ˣ upon which it may be mounted, and operated by, say, an electrical motor operatively connected with the saw, but not shown. This saw moves along a passage 93 therefor in a dividing table 94, having sides 95 inclined downward and away from the saw passage 93. In the floor 96 upon which the dividing table is fixed, there are slots 97 cut at right angles to the saw passage, and their distances apart equal the distances between ribs 98 cast on the outside of the legs and feet of the grab cage. To cut these seven blocks longitudinally, the cage is moved so that the plane of the longitudinal harvesting slot 55, Fig. 4, of the seven blocks is in the plane of the rotating circular saw. By causing the circular saw 92 to move against and under the blocks, all except one at each end, become completely divided longitudinally, the division of the end blocks being finished by splitting or by an electric hand-saw. There are now left in the cage, fourteen pieces y, y, of clear ice, of the desired form.

To release the fourteen pieces from the cage, the latter is lowered so that the bottom of the feet 81, Fig. 5, engage the inclined sides 95 of the dividing table 94; the operating rods 87 are removed from their hook supports 88; the lock bars are lifted; and the hooks 71 from the hoist are allowed to continue to descend. As the center of gravity of each piece of ice and its leg and foot, is at one side of the point of engagement between the foot and the inclined side of the dividing table, the legs with their pieces of ice, and the parallel pivot rods to which the legs are pivoted, move apart and about said points of engagement, and finally contact the delivery floor 96, as shown in Fig. 5. But when they do so, or whenever the legs are sufficiently inclined, the fourteen pieces of clear ice slide out, and off the legs, and onto a delivery floor, ready for shipment or storage. The cage is returned to operative position by raising the hook rod 85, and, when the pivot rods 82, 83, are in proper relation, by locking them therein by the lock rods 86.

Having described the construction and operation of my invention, and desiring to protect it in the broadest manner legally possible, what I claim is:—

1. A grab comprising a pair of links pivoted together; a pair of legs provided with feet extending toward each other and adapted to sustain a body; said legs being pivoted to the free ends of the links and depending therefrom; and means whereby the legs, in descending, may be caused to turn outward and downward for the purpose of discharging whatever may be contained in the grab.

2. A grab comprising a pair of links pivoted together; a pair of legs provided with feet extending toward each other; said legs being pivoted to the free ends of the links and depending therefrom; means for temporarily locking the legs, at their pivots, a predetermined distance apart; and means whereby the legs, in descending, may be caused to turn outward and downward for the purpose of discharging whatever may be contained in the grab.

3. A grab comprising a pair of links pivoted together; a pair of legs provided with feet extending toward each other and adapted to sustain a body; said legs being pivoted to the free ends of the links and depending therefrom; a dividing table centrally disposed between the feet of said legs and having outwardly and downwardly inclined sides, whereby the legs, in descending, may be caused to turn outward and downward for the purpose of discharging whatever may be contained in the grab.

4. A grab comprising a pair of links pivoted together; a pair of legs provided with feet extending toward each other and adapted to sustain a body; said legs being pivoted to the free ends of the links and depending therefrom; means for temporarily locking the legs, at their pivots, a predetermined distance apart; a dividing table centrally disposed between the feet of said legs; and having outwardly and downwardly inclined sides, whereby the feet of the descending legs, may be caused to move inward and upward and the legs to turn outward and downward, for the purpose of discharging the body contained in the grab.

5. A grab employed, during the process of harvesting, to sustain a block of ice and to deliver its severed pieces; and means to sever said block into said pieces while said block is in said grab; said grab comprising a pair of links pivoted together; a pair of legs provided with feet extending toward each other; said legs being pivoted to the free ends of the links and depending therefrom; means for locking the legs apart at a predetermined distance between their pivots; and means, when the locking means are removed and the links are allowed to descend, whereby the legs with their respective pieces of ice turn outward and downward, and thereby discharge the grab.

6. A multiple grab employed to sustain a block of ice during the process of harvesting it, and to deliver its severed parts; said grab comprising a supporting rod and two parallel pivot rods; a number of unit grabs arranged parallel with, but separated from, each other; each unit grab comprising a pair of links pivoted to the supporting rod; a pair of legs provided with feet extending toward each other, said pair of legs being pivoted to the pivot rods, and depending therefrom; means for locking the parallel pivot rods at a predetermined distance apart; and means, when the locking means are removed and the supporting rod and the pivot rods are allowed to descend, whereby the legs with the pieces of ice turn outward and downward and thereby discharge the grab.

7. A multiple grab employed to sustain a block of ice during the process of harvesting it, and to deliver its severed parts, said grab comprising a supporting rod and two parallel pivot rods; a number of unit grabs arranged parallel with, but separated from, each other; means operating between said unit grabs to sever the block transversely; each unit grab comprising a pair of links pivoted to the supporting rods; a pair of legs with feet extending toward each other but out of contact, said pair of legs being pivoted to the pivot rods and depending therefrom; means for locking the parallel pivot rods at a predetermined distance apart; means operating between the feet, employed in severing the block longitudinally; and means, when the locking means are removed and the supporting rod and the pivot rods are allowed to descend, whereby the legs with the pieces of ice turn outward and downward until the legs become so inclined that the pieces of ice will slide away from the feet and off of the legs and thereby discharge the grab.

In testimony whereof I affix my signature in presence of two witnesses.

WILLIAM T. RAY.

Witnesses:
E. F. UNIAC,
A. I. CRAWFORD.